March 12, 1963   H. J. HAGEMEYER, JR., ET AL   3,081,344
PREPARATION OF ESTERS BY ALDEHYDE CONDENSATION
Filed April 24, 1961
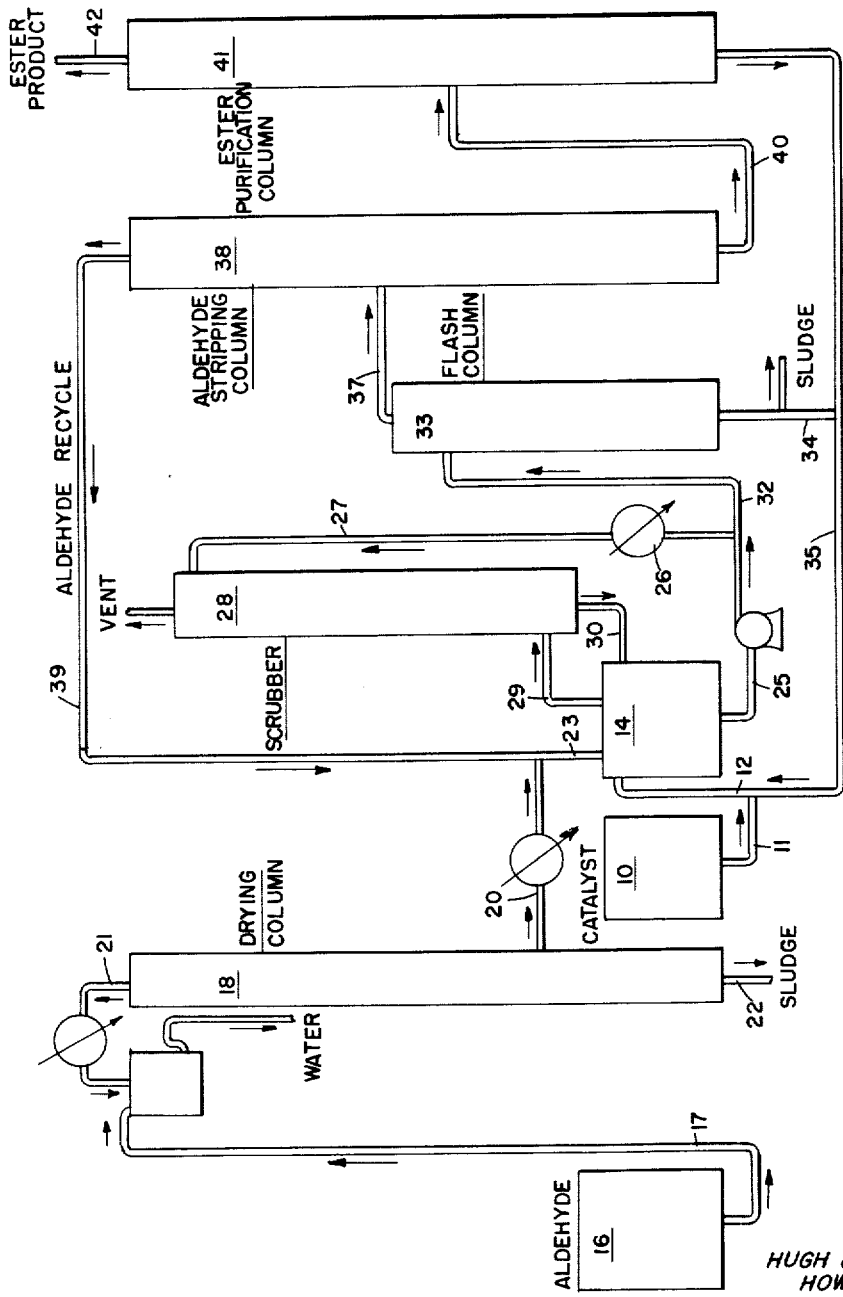
HUGH J. HAGEMEYER JR.
HOWARD N. WRIGHT JR.
INVENTORS
BY R. Frank Smith
William T. French
ATTORNEYS

United States Patent Office 3,081,344
Patented Mar. 12, 1963

3,081,344
PREPARATION OF ESTERS BY ALDEHYDE CONDENSATION
Hugh J. Hagemeyer, Jr., and Howard N. Wright, Jr., Longview, Tex., assignors to Eastman Kodak Company, Rochester, N.Y., a corporation of New Jersey
Filed Apr. 24, 1961, Ser. No. 105,033
6 Claims. (Cl. 260—494)

This invention relates to the preparation of esters and more particularly to an improved method of producing aliphatic esters by the condensation of an α-monosubstituted aliphatic aldehyde.

The esters produced by our novel process are of the general formula, $RCH_2CHR'CO_2CH_2CHR'CH_2R$, wherein R is hydrogen or a lower alkyl group and R' is a lower alkyl group. In our process such esters are obtained by the dimolecular condensation of an α-monosubstituted aliphatic aldehyde of 4 to 8 carbon atoms in the presence of an aluminum alkoxide catalyst.

The condensation of isobutyraldehyde in the presence of aluminum isobutyrate was reported by W. Tischtschenko, as abstracted in Chem. Zentr., 1906, II, 1552–56. We have now developed an improved method for carrying out this type of condensation reaction.

Reactions that can occur when an aliphatic aldehyde is contacted with an aluminum alkoxide under condensation reaction conditions are represented by the following equations:

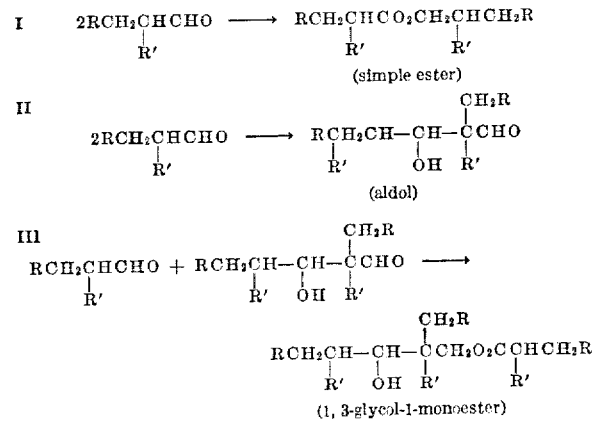

In the method of our invention we obtain a high yield of the simple ester of the formula, $$RCH_2CHR'CO_2CH_2CHR'CH_2R$$

as produced in reaction I, and reduced yields of other condensation products such as the aldol of reaction II and the 1,3-glycol-1-monoester of reaction III.

The method of our invention by which we obtain these novel results comprises, in general, continuously passing a stream of a dry, acid-free, α-monosubstituted aliphatic aldehyde of 4 to 8 carbon atoms in contact with an aluminum alkoxide through a reaction zone at a temperature of 90 to 140° C., and preferably 115 to 130° C. The reaction zone effluent is continuously distilled at a temperature below 170° C. to separate the ester product from the aluminum alkoxide without decomposing the latter. The aluminum alkoxide is recycled to the reaction zone.

The feed aldehyde for our process can be any α-monosubstituted aliphatic aldehyde of from 4 to 8 carbon atoms, including isobutyraldehyde, 2-methylbutyraldehyde, 2-ethylbutyraldehyde, 2-ethylhexanaldehyde, etc. The dimolecular condensation products of the process are esters of the formula, $RCH_2CHR'CO_2CH_2CHR'CH_2R$, such as isobutyl isobutyrate, 2-methylbutyl 2-methylbutyrate, 2-ethylbutyl 2-ethylbutyrate, 2-ethylhexyl 2-ethylhexoate, etc.

The use of an aluminum alkoxide catalyst is an essential element of our process. A more basic catalyst such as magnesium alkoxide results in an excessive formation of aldol or of glycol monoester by reactions II and III above. The aluminum alkoxide catalyst is prepared by reacting aluminum metal with an aliphatic alcohol. In general, any aliphatic alcohol having no more than about 8 carbon atoms can be employed but aluminum alkoxides of the primary aliphatic alcohols of 4 to 8 carbon atoms catalyze the aldehyde condensation reaction better than those of the lower alcohols or the secondary alcohols. Preferably, we employ the alcohol derived from the feed aldehyde in order to prevent ester interchange when the aluminum alkoxide is in contact with the ester product.

The aluminum metal and alcohol react in the ratio of one mole of aluminum to 3 moles of alcohol but preferably an excess, e.g. 10% molar excess, of the dry alcohol is employed. The reaction is preferably catalyzed with a halogenic activator such as aluminum chloride, mercuric chloride, iodine or carbon tetrachloride.

In the process of our invention the condensation reaction is carried out under substantially anhydrous conditions and in an acid-free medium. Accordingly, the catalyst is also prepared under substantially anhydrous and acid-free conditions. In forming the catalyst the alcohol should contain less than 100 parts by weight per million parts of alcohol (hereinafter abbreviated as p.p.m.) of water and acid. When the reaction between the alcohol and the aluminum is complete the aluminum alkoxide is dissolved in enough dry aliphatic ester, i.e. a portion of the desired ester product, to form a convenient catalyst solution, e.g., 5 to 25 weight percent catalyst. Except for the ester itself that is used as the catalyst solvent, no solvent is used in our process. In fact, the use of a solvent will reduce the rate of reaction by dilution and is therefore to be avoided.

Our novel process will be described in more detail by reference to the drawing, the sole FIGURE of which is a schematic flow diagram of a preferred embodiment of the process.

The catalyst solution, e.g., a 10% solution of aluminum isobutoxide in isobutyl isobutyrate, is supplied from a catalyst tank 10 via lines 11 and 12 to the reactor 14. The aliphatic aldehyde, e.g. isobutyraldehyde, is supplied from an aldehyde feed tank 16 via line 17 to the drying column 18. Distillation in column 18 is carried out under conditions adapted to reduce the water content of the aldehyde to less than 20 p.p.m., and preferably to less than 10 p.p.m., and to reduce the acid content to less than 100 p.p.m. The aldehyde is withdrawn as a side stream from column 18 via line 20, thus being separated from the water taken overhead by line 21 and the acid and higher boiling impurities removed as a bottoms sludge by line 22. The dry, acid-free aldehyde stream is continuously fed to the reactor 14 by line 23 where it mingles with the catalyst introduced by line 12.

Reactor vessel 14 preferably is provided with means for agitating the reaction mass, such as a mechanical stirrer or a circulating pump, and with means for heating or cooling the reactor, such as a heating or cooling jacket surrounding the vessel or a coil within the vessel, not shown in the schematic flow diagram. The reactor is blanketed with a dry, inert atmosphere such as nitrogen or methane. The reactor temperature is maintained at 90–140° C. and preferably at 115–130° C. The reactor is maintained approximately at atmospheric pressure although somewhat higher or lower pressure can be used. The feed rate of aluminum alkoxide catalyst to the reactor is selected in accordance with the aldehyde feed rate to provide a catalyst concentration in the range of 0.5 to 4.0 weight percent based on the aldehyde. The feed rate of the aldehyde is selected to provide a residence time in the reactor preferably of about 0.5 to 2 hours and most preferably about one hour, although shorter or longer residence time is permissible.

The reactor temperature can be controlled by external heating or cooling or by controlling the feed rate of the aldehyde or catalyst. We prefer to employ constant feed rates selected to provide the preferred catalyst concentration and conversion level and to control the reactor temperature by external heating or cooling.

The crude reaction product is continuously withdrawn from reactor 14 by line 25. A portion of the crude product is recycled to the reactor via cooling means 26, line 27 and scrubber 28. Vapor introduced from reactor 14 to the bottom of the scrubber column 28 by line 29 is countercurrently contacted with cooled recycle liquid introduced at the top of the scrubber by line 27. Liquid from the scrubber, including condensed vapor, is returned to the reactor by line 30. Thus the cooling means 26, the scrubber 28, the associated lines 27, 29 and 30 and the atmospheric pressure vent 31 serve as a reflux system for reactor 14.

Another portion of the crude product is passed by line 32 to the flash column 33. In the latter column the crude product stream is vacuum distilled from the catalyst at the lowest possible pressure, depending on the vapor pressures of the aliphatic aldehyde and ester. In any event, this distillation is carried out at a temperature below 170° C. By limiting the temperature in column 33 to a temperature below 170° C. the aluminum alkoxide catalyst is not decomposed. The catalyst is continuously withdrawn as a bottom stream from column 33 and is recycled by lines 34 and 35 to line 12 and the reactor 14.

The overhead stream from column 33 comprising the desired ester product and unreacted aldehyde is passed by line 37 to the stripping column 38 wherein the aldehyde and the ester are separated by atmospheric or vacuum distillation. The aldehyde overhead stream is recycled by line 39 to reactor 14 and the ester bottom stream is passed by line 40 to the ester purification column 41. In the latter column the ester is separated from higher boiling impurities which are recycled to the reaction zone and the purified ester product is recovered overhead by line 42.

As we have indicated, the catalyst is prepared from dry, acid-free alcohol and the aldehyde feed is also dry and free of acid. Unless these precautions are observed the aluminum alkoxide is decomposed and cannot be recycled. Furthermore, aluminum hydroxide, which is formed in the decomposition of the aluminum alkoxide by water or acid, catalyzes the formation of the aldol of reaction II and the trimolecular condensation product, the glycol monoester of reaction III. Accordingly, we prepare the catalyst under anhydrous and acid-free conditions and we dry the aldehyde feed, and if necessary remove any acid therefrom, before contacting the aldehyde with the catalyst. The alcohol used in preparing the catalyst must contain less than 100 p.p.m. of water or acid and the reaction feeds, comprising the aldehyde as the major component and the catalyst solution as the minor component, must contain less than 20 p.p.m. of water and less than 100 p.p.m. of acid. We obtain longest catalyst life when the aldehyde feed is dried to an extent such that the reaction feeds contain less than 10 p.p.m. of water.

We have described the purification of the aldehyde feed by distillation. This is the preferred method for reducing both the water and acid content of the aldehyde to the indicated low levels. However, other purification methods can be used, including azeotropic distillation and the use of adsorbent drying to reduce the acid content. Likewise, the alcohol used in preparing the catalyst can be purified by any of the conventional procedures for reducing water and acid content of an alcohol.

The method of our invention and operations outside of the scope of our method are illustrated by the examples which follow. The first example demonstrates a preferred embodiment of our process in which the feed aldehyde is isobutyraldehyde, substantially free of water and acid, and the reaction temperature is above 115° C. It shows the surprisingly high yield of the desired ester, isobutyl isobutyrate.

*Example 1*

Isobutyraldehyde containing 5 p.p.m. water and less than 0.01 percent isobutyric acid was fed into a 3 liter stirred reactor at 1.7 liters per hour. Aluminum isobutoxide dissolved in isobutyl isobutyrate, was fed continuously to give 1.4 to 1.5 weight percent aluminum isobutoxide in the reactor crude product. Reactor temperature was maintained at about 120° C. by the use of some external heating, and holdup time was 0.6 hour. The crude reactor product contained 0.6 percent unreacted isobutyraldehyde and isobutyraldol, 5.1 percent isobutanol, 92.4 percent isobutyl isobutyrate and 1.9 percent glycol ester and high boilers. The crude product was flashed from the catalyst and high boilers at 25 to 50 mm. mercury pressure, then redistilled at atmospheric pressure. The redistilled isobutyl isobutyrate contained less than 1 percent impurities. Yield of isobutyraldehyde to ester was 97.9 percent and to glycol ester 2.1 percent.

The next two examples demonstrate the use of a temperature below the range used in our process. In comparison with Example 1 they show considerably lower yield of isobutyl isobutyrate and high yield of the glycol ester.

*Example 2*

Isobutyraldehyde containing less than 10 p.p.m. water and less than 0.01 percent isobutyric acid was fed into a 3 liter stirred reactor at 0.9 liter per hour. Aluminum isobutoxide catalyst that had been used in three previous runs, such as described in Example 1, was fed continuously to give 2.0 weight percent aluminum isobutoxide in the reactor. Reactor temperature was maintained at 70° C. by adjusting the rate of catalyst addition. Reactor holdup time was 1.2 hours. The crude reactor product contained 3.2 percent isobutyraldehyde and aldol, 0.8 percent isobutanol, 81 percent isobutyl isobutyrate and 15 percent glycol ester and high boilers. The yield of isobutyraldehyde to isobutyl isobutyrate was 83.7 percent. Reactor crude product was purified as in Eaxample 1.

*Example 3*

Isobutyraldehyde containing less than 10 p.p.m. water and less than 0.01 percent isobutyric acid was fed into a 3 liter stirred reactor at 0.9 liter per hour. Aluminum isobutoxide catalyst solution was fed continuously at the rate to produce a reaction temperature of 60–80° C. The crude product contained 3.2 weight percent aluminum isobutoxide, 2.5 percent isobutyraldehyde, 1.4 percent isobutanol, 79.9 percent isobutyl isobutyrate and 13.0 percent glycol ester and high boilers. Reactor holdup time was 1.2 hours. The crude reactor product was uurified as in Example 1.

The next example demonstrates a large scale operation of our new process.

*Example 4*

Isobutyraldehyde containing less than 5 p.p.m. water and less than 0.01 percent isobutyric acid was fed into a 100 gallon capacity circulated reactor at 2300 pounds per day. The catalyst solution was fed continuously at the rate to maintain 0.6 weight percent aluminum isobutoxide in the reactor. The reactor temperature was maintained between 105 and 116° C. by external heating. The reactor crude product contained 3 to 5 percent isobutyraldehyde, 2 percent isobutanol, 89 to 94 percent isobutyl isobutyrate and 6 to 11 percent glycol ester. Reactor residence time was four hours. The crude reactor product was purified in a continuous distillation system, as in Example 1.

The next two examples demonstrate the use of different aldehyde feeds and the reaction of such aldehydes at low temperature and subsequently at temperature within the scope of our process.

*Example 5*

2-methylbutyraldehyde was dried under a Dean-Stark tube and redistilled to produce a fraction boiling at 92° to 93° C. A solution containing 5 grams of aluminum amyloxide was added to 500 grams of the redistilled aldehyde. The reaction temperature was maintained below 70° C. by cooling. The conversion of 2-methylbutyraldehyde to 2-methylbutyl 2-methylbutyrate was 57 percent. This procedure was repeated and the reaction temperature was 120° C. After one hour, the conversion to 2-methylbuyl 2-methylbutyrate was 91 percent.

*Example 6*

When 2-ethylbutyraldehyde was reacted by the method of Example 5 at a temperature below 70° C., the conversion to the 12-carbon ester, 2-ethylbutyl 2-ethylbutyrate, was 65 percent. The reaction was carried out at 125° C. and the conversion to the ester was 88 percent.

As demonstrated by the above working examples, our use of a reaction temperature substantially higher than has previously been considered suitable for such aldehyde condensation reaction, i.e. 90 to 140° C. and preferably 115 to 130° C., in combination with the other elements of our process results in an unexpected improvement in the yield of the desired simple ester and a reduced or negligible yield of products such as the glycol monoester and the aldol. By carrying out the reaction with continuous flow of feed, catalyst and product streams, we are able to control the feed rates (and thus the catalyst-aldehyde ratio and the residence time), the reactor temperature and the drying column operation within narrow limits. Thus we achieve the benefits of the novel combination of reaction conditions that characterize our process. Also by using a continuous flow system, in contrast to a batch-type reaction, we maintain a low concentration of free aldehyde in the reaction zone. This aids in maintaining the required reaction temperature and substantially eliminating reactions II and III indicated above.

Furthermore, our use of anhydrous and acid-free reactants and catalyst and low-temperature (i.e. below 170° C.) distillation of the crude product prevent decomposition of the aluminum alkoxide catalyst and make it possible to recycle the catalyst to the reaction zone, essentially free of aluminum hydroxide that would promote formation of the undesired glycol ester.

We have thus provided an improved method for obtaining the simple aliphatic ester dimolecular condensation product. Most importantly the new method provides a high yield of the desired simple aliphatic ester with a minimum amount of undesired by-products.

Although the invention has been described in considerable detail with reference to certain preferred embodiments thereof, it will be understood that variations and modifications can be effected within the spirit and scope of the invention as described hereinabove and as defined in the appended claims.

We claim:
1. The process which comprises continuously passing a stream of α-monosubstituted aliphatic aldehyde of from 4 to 8 carbon atoms in contact with an aluminum alkoxide catalyst through a reaction zone at a temperature of 90 to 140° C., said aldehyde and said aluminum alkoxide having such a low content of water and acid that the mixture of aldehyde and aluminum alkoxide fed to the reaction zone contains less than 20 p.p.m. of water and less than 100 p.p.m. of acid, continuously distilling the reaction zone effluent at a temperature below 170° C. to separate the aluminum alkoxide from the ester product, and recycling aluminum alkoxide to the reaction zone.

2. The process which comprises drying to a water content less than 10 p.p.m. a $C_4$–$C_8$ aldehyde of the formula, $RCH_2CHR'CHO$, wherein R is selected from the group consisting of hydrogen and lower alkyl groups and R' is a lower alkyl group, and reducing the acid content of the aldehyde to less than 100 p.p.m., continuously passing a stream of said aldehyde through a reaction zone in contact with a stream of a substantially dry and acid-free solution of an aluminum alkoxide catalyst prepared from the alcohol derived from said aldehyde, the mixture of aldehyde and catalyst fed to the reaction zone having a water content less than 10 p.p.m. and an acid content less than 100 p.p.m., said reaction zone being maintained at a temperature of 115 to 130° C., continuously distilling the reaction zone effluent at a temperature below 170° C. to separate undecomposed aluminum alkoxide catalyst from an ester product of the formula,

$RCH_2CHR'CO_2CH_2CHR'CH_2R$ and recycling said catalyst to the reaction zone.

3. The process for preparing an ester of the formula, $RCH_2CHR'CO_2CH_2CHR'CH_2R$, wherein R is selected from the group consisting of hydrogen and lower alkyl groups and R' is a lower alkyl group, which comprises distilling a stream of a $C_4$–$C_8$ aldehyde of the formula, $RCH_2CHR'CHO$, and reducing its water content to less than 10 p.p.m. and its acid content to less than 100 p.p.m., forming a catalyst solution of an aluminum alkoxide and said ester, said aluminum alkoixde being prepared from the alcohol derived from said aldehyde and having a water content of less than 100 p.p.m. and an acid content of less than 100 p.p.m., continuously passing a stream of said aldehyde in contact with a stream of said catalyst solution through a reaction zone at atmospheric pressure and a temperature of 115 to 130° C., the flow rate of said aldehyde and catalyst streams being such that the concentration of catalyst in the reaction zone is from 0.5 to 4.0 weight percent based on the aldehyde and the residence time within the reaction zone is about 0.5 to 2 hours, vacuum distilling the reaction zone effluent at a temperature below 170° C. to separate undecomposed aluminum alkoxide from said ester reaction product and recycling said catalyst to the reaction zone.

4. The process which comprises distilling a stream of isobutyraldehyde and reducing its water content to less than 10 p.p.m. and its acid content to less than 100 p.p.m., forming a catalyst solution of about 5 to 25% aluminum isobutoxide in isobutyl isobutyrate having a water content of less than 10 p.p.m. and an acid content of less than 100 p.p.m., continuously passing a stream of said isobutyraldehyde through a reaction zone in contact with a stream of said catalyst solution at a temperature of 115–130° C., the flow rates of the aldehyde and catalyst streams being such that the concentration of catalyst in the reaction zone is from 0.5 to 4.0 weight percent based on the aldehyde and the residence time within the reaction zone is about one hour, vacuum distilling the reaction zone effluent at a temperature below 170° C. to separate undecomposed aluminum isobutoxide catalyst from the isobutyl isobutyrate reaction product and recycling said catalyst to the reaction zone.

5. The process which comprises distilling a stream of 2-methylbutyraldehyde and reducing its water content to less than 10 p.p.m. and its acid content to less than 100 p.p.m., forming a catalyst solution of about 5 to 25% aluminum amyloxide in 2-methylbutyl 2-methylbutyrate having a water content of less than 10 p.p.m. and an acid content of less than 100 p.p.m., continuously passing a stream of said 2-methylbutyraldehyde through a reaction zone in contact with a stream of said catalyst solution at a temperature of 115–130° C., the flow rates of the aldehyde and catalyst streams being such that the concentration of catalyst in the reaction zone is from 0.5 to 4.0 percent based on the aldehyde and the residence time within the reaction is about one hour, vacuum distilling the reaction zone effluent at a temperature below 170° C.

to separate undecomposed aluminum amyloxide catalyst from the 2-methylbutyl 2-methylbutyrate reaction product and recycling said catalyst to the reaction zone.

6. The process which comprises distilling a stream of 2-ethylbutyraldehyde and reducing its water content to less than 10 p.p.m. and its acid content to less than 100 p.p.m., forming a catalyst solution of about 5 to 25% aluminum 2-ethylbutoxide in 2-ethylbutyl 2-ethylbutyrate having a water content of less than 10 p.p.m. and an acid content of less than 100 p.p.m., continuously passing a stream of said 2-ethylbutyraldehyde through a reaction zone in contact with a stream of said catalyst solution at a temperature of 115–130° C., the flow rates of the aldehyde and catalyst streams being such that the concentration of catalyst in the reaction zone is from 0.5 to 4.0 weight percent based on the aldehyde and the residence time within the reaction zone is about one hour, vacuum distilling the reaction zone effluent at a temperature below 170° C. to separate undecomposed aluminum 2-ethylbutoxide catalyst from the 2-ethylbutyl 2-ethylbutyrate reaction product and recycling said catalyst to the reaction zone.

References Cited in the file of this patent
UNITED STATES PATENTS

| | | |
|---|---|---|
| 1,642,689 | Mudgan et al. | Sept. 20, 1927 |
| 2,412,469 | Nicholl et al. | Dec. 10, 1946 |
| 2,774,792 | Carlson et al. | Dec. 18, 1956 |

OTHER REFERENCES

Kulpinski et al.: "Journal of Organic Chemistry," vol. 8 (1943), pp. 256–270.

UNITED STATES PATENT OFFICE
CERTIFICATE OF CORRECTION

Patent No. 3,081,344            March 12, 1963

Hugh J. Hagemeyer, Jr., et al.

It is hereby certified that error appears in the above numbered patent requiring correction and that the said Letters Patent should read as corrected below.

Column 6, line 28, for "alkoixde" read -- alkoxide --; line 30, for "100" read -- 10 --.

Signed and sealed this 22nd day of October 1963.

(SEAL)
Attest:

ERNEST W. SWIDER           EDWIN L. REYNOLDS
Attesting Officer           Acting Commissioner of Patents